US006956460B2

(12) United States Patent
Tsui

(10) Patent No.: US 6,956,460 B2
(45) Date of Patent: Oct. 18, 2005

(54) TRANSMITTER FOR OPERATING ROLLING CODE RECEIVERS

(76) Inventor: Philip Y.W. Tsui, 2203-35 Kingsbridge Garden Cir. Skymark West 1, Mississauga, Ontario (CA), L5R 3Z5

( * ) Notice: Subject to any disclaimer, the term of this patent is extended or adjusted under 35 U.S.C. 154(b) by 580 days.

(21) Appl. No.: 10/051,331

(22) Filed: Jan. 15, 2002

(65) Prior Publication Data

US 2003/0189530 A1 Oct. 9, 2003

(51) Int. Cl.$^{7}$ .......................... G05B 19/00; H04B 1/00; G08C 19/00

(52) U.S. Cl. ...................... 340/5.26; 340/5.7; 340/5.71; 340/825.69; 340/825.72

(58) Field of Search ....................... 340/825.69, 825.72, 340/5.71, 5.7, 5.26

(56) References Cited

U.S. PATENT DOCUMENTS 4,928,098 A 5/1990 Dannhaeuser
5,089,692 A 2/1992 Tonnesson
5,107,258 A * 4/1992 Soum ........................ 340/5.26
5,600,324 A 2/1997 Reed et al.
5,680,134 A 10/1997 Tsui
5,774,065 A * 6/1998 Mabuchi et al. ....... 340/825.72
5,841,390 A 11/1998 Tsui
5,923,758 A 7/1999 Khamharn et al.
5,969,637 A 10/1999 Doppelt et al.
6,005,508 A 12/1999 Tsui
6,025,785 A 2/2000 Farris et al.
6,078,271 A * 6/2000 Roddy et al. .......... 340/825.72
6,154,544 A 11/2000 Farris et al.
6,169,492 B1 1/2001 Dabbish
6,243,000 B1 6/2001 Tsui
6,249,673 B1 6/2001 Tsui
6,359,558 B1 3/2002 Tsui
6,441,719 B1 8/2002 Tsui
2001/0034213 A1 10/2001 Tsui

FOREIGN PATENT DOCUMENTS

WO WO 99/41693 8/1999

* cited by examiner

*Primary Examiner*—Michael Horabik
*Assistant Examiner*—Kimberly Jenkins
(74) *Attorney, Agent, or Firm*—Crowell & Moring LLP

(57) ABSTRACT

A fixed transmitter for operating a rolling code receiver is disclosed. A set of fixed codes is captured from a rolling code transmitter that is used to actuate a corresponding rolling code receiver. The set of fixed codes is stored in a memory of a fixed code transmitter. The fixed code transmitter, upon each actuation, transmits one or more codes of the set of fixed codes to operate the rolling code receiver. The set of stored fixed codes in the fixed code transmitter has fewer codes than a total number of unique codes that can be generated by the rolling code receiver.

17 Claims, 7 Drawing Sheets

PRIOR ART

TRANSMITTER FOR OPERATING ROLLING CODE RECEIVERS

BACKGROUND

1. Field of the Invention

The present disclosure is directed in general to security systems and in particular to a security system that includes a transmitter for operating a rolling code receiver.

2. Description of the Related Art

Transmitter-receiver controller systems are widely used for remote control and/or actuation of devices or appliances such as garage door openers, gate openers, and security systems. Rather than transmitting a single code N to operate the receiver, rolling code technology is based on the idea that the recognized operating code of the security system changes each time an operating code is provided. The activation code is altered each time in both the transmitter and the receiver according to a rolling code algorithm, which produces a specific number of possible code combinations. In most cases, the transmitter and receiver of a rolling code system both contain a synchronized code generator that calculates a new operating code each time a code is provided and/or received. Thus, the operating code combination N of the system changes to code combination N+1 after code N is used, then code N+1 changes to code combination N+2 and so on.

In the case of a transmitter, its code generator produces a new code (e.g., N+1) each time it transmits a code, whether or not the receiver actually received the new code. While in the case of the receiver, its code generator advances to a new code (e.g., N+1) only when it receives a valid code. However, where the transmitter transmits a code, but the receiver does not receive the transmitted code, the transmitter and receiver will be out of synchronization. That is, the code generator in the transmitter will be further along in the code sequence than the code generator in the receiver. This may occur, for example, when the transmitter is activated outside the maximum range of the receiver. Thus, when a rolling code transmitter is activated "out of range," the transmitter will transmit code N and advance its rolling code to code N+1, but the receiver will remain at code N and continue to expect code N. When the rolling code transmitter is activated "in range," it will transmit code N+1, but the rolling code receiver will not respond because it expects code N.

To avoid having to reset the rolling code generator each time the transmitter and receiver are out of synchronization, manufacturers of rolling code systems provide code windows. Some manufacturers provide one or more forward windows, while others will also provide a backward window. Rolling code receivers having code window will be activated, not only by the current code N in the rolling code sequence, but also at any other code in the designated code window.

SUMMARY OF THE INVENTION

In one embodiment, a transmitter-receiver system includes a rolling code receiver that generates a sequence of unique codes based on a rolling code algorithm, and a fixed code transmitter including a memory that contains a set of fixed codes. The fixed code transmitter is operable to transmit one or more codes of the set of fixed codes to operate the rolling code receiver.

Other embodiments are disclosed and claimed herein.

DETAILED DESCRIPTION

One aspect of the present disclosure relates to providing a fixed code transmitter that can be used to operate a rolling code receiver to actuate a controlled device such as a garage door, car alarm, etc. In one embodiment, a plurality of identified codes emitted from a rolling code transmitter are captured and stored in a transmitter. Each time the transmitter is actuated, one or more of the stored fixed codes are transmitted to a rolling code receiver, which will accept and be activated by at least one code. The transmitter may also be used to operate a plurality of different rolling code receivers. The transmitter may include one or more inputs which allow(s) a user to select which of one or more rolling code receiver types to control. The transmitter may then control the selected rolling code receiver by retrieving the one or more fixed codes corresponding to the selected rolling code receiver from memory and transmitting the one or more fixed codes to the selected receiver.

Figure 1:
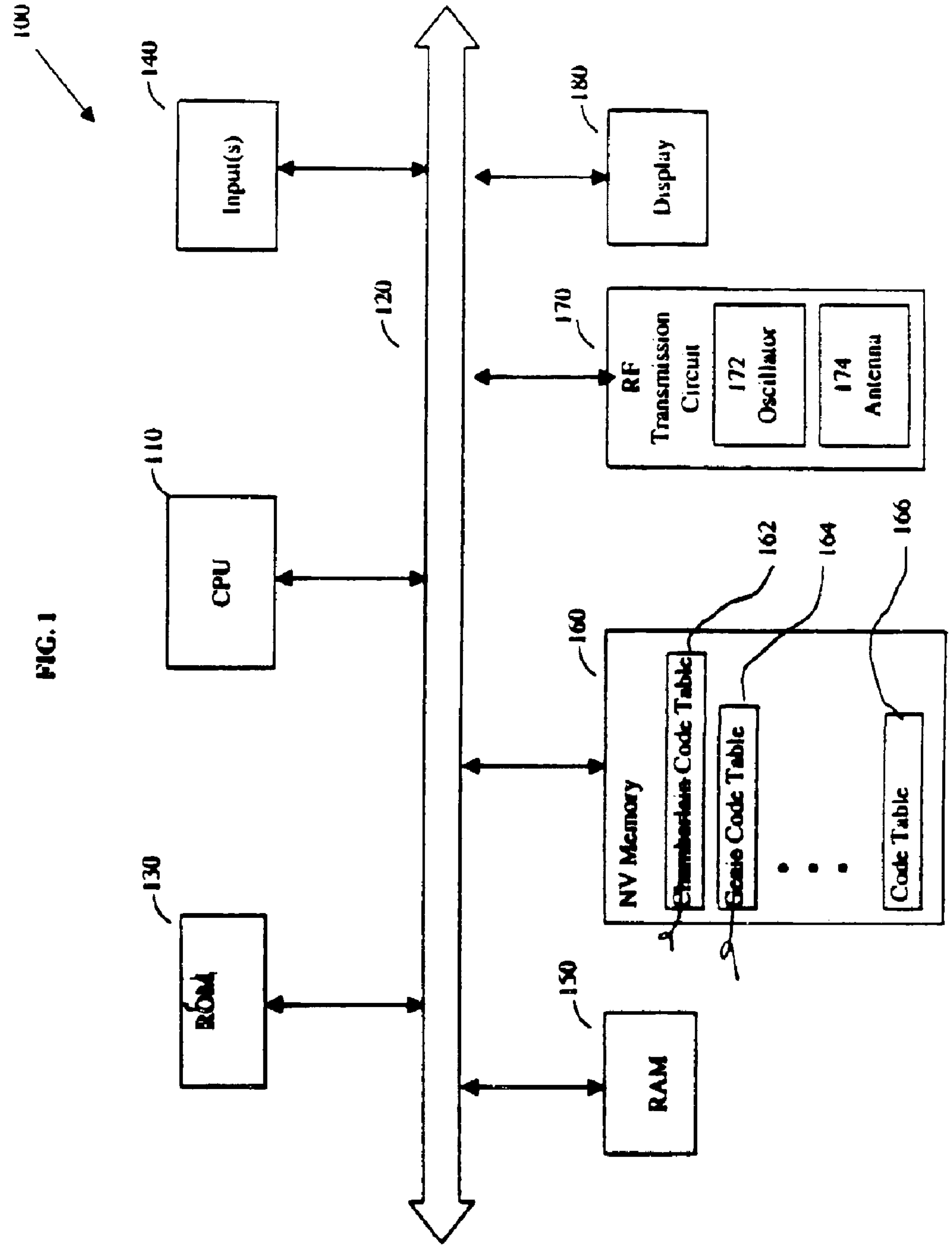
FIG. 1 is a block diagram depicting a transmitter, according to one embodiment.

FIG. 1 is a block diagram depicting a transmitter 100, according to one embodiment. Referring to FIG. 1, the transmitter 100 includes a processor or central processing unit (CPU) 110, read-only memory (ROM) 130, input(s) 140, random access memory (RAM) 150, non-volatile (NV) memory 160, radio frequency (RF) transmission circuit 170, and optional display 180 coupled together by one or more buses 120. The transmitter 100 includes a portable battery or other power source (not shown) which powers the transmitter 100 upon actuation of an input.

The CPU 110 may take any form such as a microprocessor, microcontroller, digital signal processor (DSP), reduced instruction set computer (RISC), application specific integrated circuit (ASIC), and the like. The input(s) 140 may include an alphanumeric keypad, one or more DIP switches, buttons or other known means of input. The display 180 may comprise light emitting diodes (LED) and/or a liquid crystal display (LCD) screen. The RF transmission circuit 170 includes an oscillator 172 and antenna 174. The RF transmission circuit 170 may also include an analog to digital converter or other similar device to convert digital signals from the CPU 110 to an analog signal(s) for applying to the oscillator 172. When actuated, the CPU 110 retrieves data from memory (e.g., using pointers) and produces coded signals to the RF circuit 170, which, in response to the coded signals, transmits an RF signal via antenna 174.

In another embodiment, the transmission circuit 170 may be operable to transmit infrared (IR) signals.

The NV memory 160 may include one or more of flash memory, electrically erasable programmable read-only memory (EEPROM), and NVRAM. The NV memory 160 may be used to store one or more code tables for operating one or more respective rolling code receivers. Each code table includes a set of one or more fixed codes for operating a particular type/brand of a rolling code receiver. For sake of illustration, the present disclosure will focus on operating/controlling two popular types of rolling code receivers, at least one type of Chamberlain® rolling code receiver and one type of Genie® rolling code receiver. It is to be noted that the disclosure is not limited to controlling only these types of rolling code receivers, but applies to controlling any type of rolling code receiver. Consequently, NV memory 160 contains a Chamberlain code table 162, which is a data table containing a plurality or set of fixed codes for at least one Chamberlain® brand rolling code receiver, and a Genie® code table 164, which holds a plurality or set of activation codes for at least one Genie® brand rolling code receiver. NV memory 160 may hold any number of code tables, such as code table 166, for other brands and/or models of rolling code receivers. Each code table may also be associated with one or more data, stored in a different location in NV memory 160 or appended to the code table, which may be used to define the transmission frequency, modulation technique, and/or other information associated with the rolling code receiver being controlled.

One or more of the code tables may instead be contained in ROM 130. The NV memory 160 provides flexibility in that code tables for newer and other types of rolling code receivers may be programmed into the NV memory 160. This may be accomplished by operating one or more combination of input(s) 140 to put the CPU 110 into a program mode. The RAM 150 may be used to store program code, variables, or used as a scratchpad area.

It is to be noted that the number of codes in each code table is smaller, typically substantially smaller, than the number of possible code combinations for each respective rolling code algorithm. Additionally, the codes in each code table is captured and stored in NV memory 160 prior to transmission of a code. This is to be distinguished from rolling code systems which calculate the next code to be transmitted/received on the fly using a secret algorithm.

A user, using input(s) 140, can select to transmit one or more codes from a code table to control a particular rolling code receiver. The one or more codes are retrieved from the code table in NV memory 160 by the CPU 110. CPU 110 then causes the RF transmission circuit 170 to transmit a signal with the one or more codes to operate the particular rolling code receiver.

Figure 2:
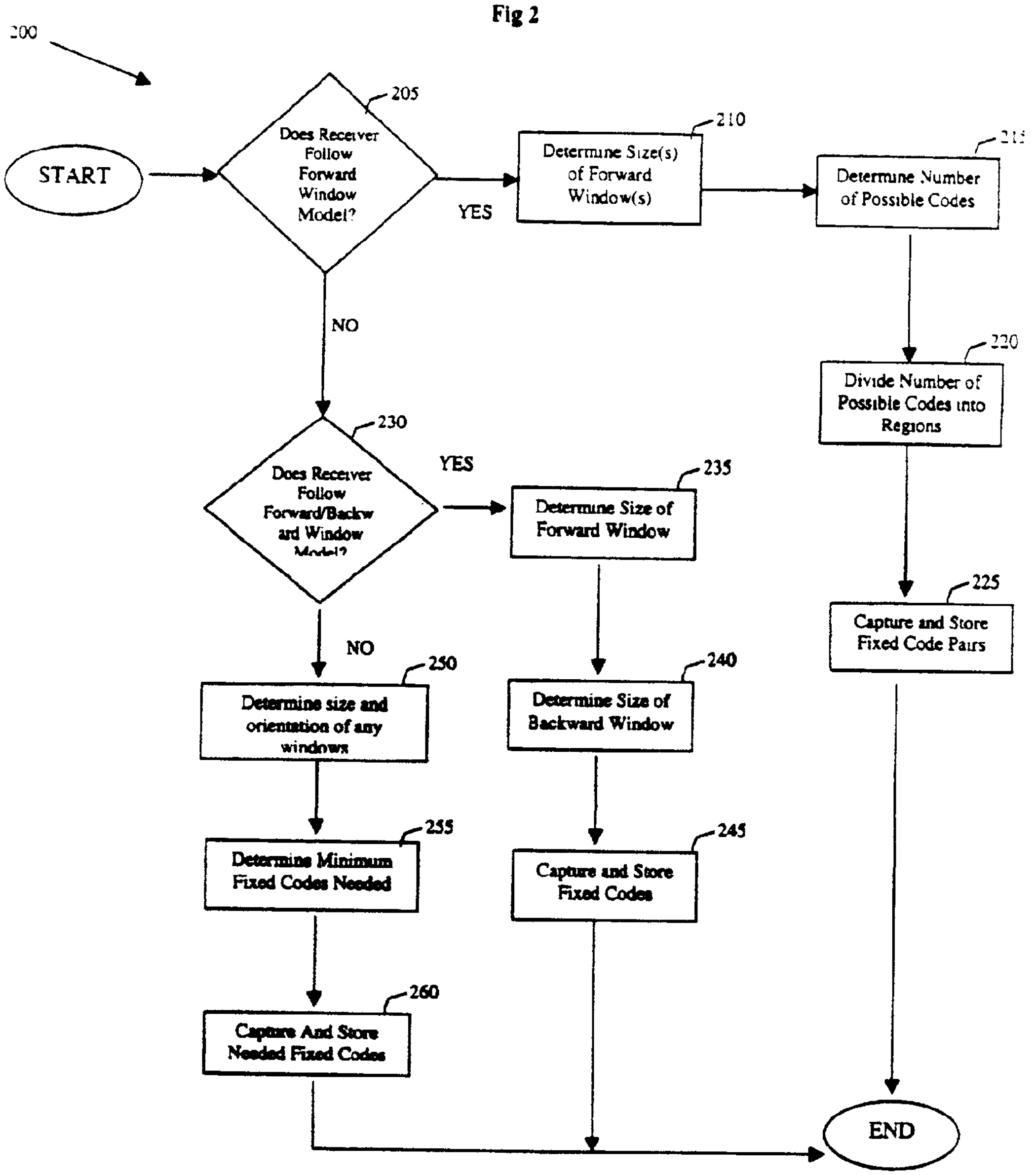
FIG. 2 is a flow diagram illustrating a process for determining a set of codes for controlling a rolling code receiver, according to one embodiment.

Referring now to FIG. 2, an exemplary process 200 for programming fixed code transmitter 100 for use with a rolling code receiver is provided. As mentioned in the background section, most rolling code systems utilize code windows to avoid having to reset the rolling code system every time the code generators for the rolling code transmitter and receiver are no longer synchronized. The code window simply refers to some subset of the total number of activation codes the code generator can possibly produce utilizing the rolling code algorithm. For example, a code generator capable of producing 100,000 different possible codes may set a code window that is 1,000 codes wide and in a sequence. This means that, at any given time, the rolling code receiver can be activated by the current received code as well as any code within this code window.

In one rolling code system employing one or more forward windows, such as that used by at least one Genie® brand of garage door openers, a rolling code receiver accepts and is actuated by (i) the current received code in the rolling code sequence, (ii) a single code within a small forward window of the code sequence, or (iii) two separate codes within a big forward window of the code sequence. In some cases, the two codes within the big forward window must fall within a predetermined number of each other along the code sequence in order to be accepted by the receiver. This predetermined number may be referred to hereinafter as the "code pair spread." For convenience, any rolling code system that employs one or more forward windows, will also be referred to hereafter as following the forward window model. One feature of one type of a rolling code receiver that employs a forward window model is that, once a receiver accepts a transmitted code, the receiver's current operating code becomes the accepted code.

By way of a non-limiting example, suppose the current code for a rolling code receiver is 700, the small forward window size is 10, the big forward window size is 5000, and the code pair spread size is 10. Suppose now that a transmitter transmits code 708 in the code sequence. Since this code is in the small forward window, the rolling code receiver will accept the code and actuate a device (e.g., open/close a garage door, arm/disarm a security system or car alarm, etc.). The new operating code of the rolling code receiver will be 708, meaning that it will now expect code 709 in the code sequence for the next activation. The rolling code receiver calculates each code using a secret algorithm.

Alternatively, suppose the transmitter had transmitted code 3500 in the code sequence. Since this code is outside the small forward window, it will have to be followed by a second code within 10 codes of code 3500 in the code sequence to be accepted by the rolling code receiver. Suppose now that the transmitter transmits a second code of 3505. At this point, the rolling code receiver will accept the code pair and be activated to actuate the device. The new operating code for the rolling code receiver will then be code 3505, meaning that the receiver now expects code 3506 to be the next code in the code sequence.

In another rolling code system, which employs code windows, such as that used by at least one Chamberlain® brand of garage door openers, both forward and backward windows are utilized. In this model, the rolling code receiver accepts (i) the current code, (ii) any code in the code sequence falling within the forward window, or (iii) any other two sequential codes, so long as the two sequential codes do not fall within the previous X number of codes along the code sequence. In at least one such type of a rolling code receiver, the receiver updates its current operating codes to the last accepted code. For convenience, this type of code window system will also be referred to hereafter as following a forward/backward window model. In yet another rolling code system, only a single forward window may be employed, without using a second forward window or a backward window.

With this in mind, it is readily possible to determine/observe whether a rolling code system employs one or more forward windows, a backward window, and/or combinations thereof, and the size(s) of the code window(s), without knowing the secret algorithm utilized by the rolling code system and how the codes in the code sequence are calculated. Once the window(s) and size(s) of the window(s) are determined, a transmitter, storing a small set of codes, typically substantially smaller than the possible number of codes used by a rolling code system, may be utilized to operate the rolling code receiver.

FIG. 2 is a flow diagram illustrating an exemplary process 200 for determining a set of codes for controlling a rolling code receiver, according to one embodiment. Referring to FIG. 2, process 200 begins at decision block 205 where a determination is made as to whether or not a rolling code receiver follows a forward window model. This may be accomplished, for example, by either knowing the type of receiver or through experimentation. If the rolling code receiver follows a forward window model, then the size(s) of the one or more forward windows are determined at block 210. This may be accomplished by sequentially detecting codes transmitted from a subject rolling code transmitter to a corresponding rolling code receiver and observing the receiver's response. In one embodiment, codes may be detected using a computer, coupling output and input ports of the computer to the rolling code transmitter, or utilizing software on the computer to sequentially actuate the transmitter and read each sequentially transmitted code. More specifically, an output signal line or port of a computer (e.g., printer port) is coupled to a control input terminal of a relay (e.g., solid state relay). The output terminals of the relay are coupled across a switch of the rolling code transmitter used to actuate the transmitter. An input signal line or port of the computer is coupled to an output signal line of the rolling code transmitter. A simple software routine, script, etc. may be utilized to sequentially activate the relay (and thus the transmitter) and then read back the corresponding transmitted code via the input port. Since different rolling code transmitters (of the same manufacturer and/or different manufacturers) may have different timing requirements, the software must be configured to account for the different timing requirements. This embodiment facilitates the reading of many codes of the rolling code transmitter in a short period of time. Other embodiments may be utilized to read codes.

It has been observed that in at least one forward window model rolling code system, a small forward window contains 15 codes and a big forward window contains 16384 codes. It should be appreciated, however, that other systems may employ one or more forward windows each spanning a larger or smaller number of codes. The process of determining the small and big forward windows for one type of rolling code system will be discussed in more detail below with reference to FIGS. 3 and 4. At block 215, the total number of possible codes in the code sequence is determined, if not already done so in block 210. By way of illustration, one rolling code system has a total of 65,536 codes.

Once the number of forward window(s) (and the size(s) of the forward window(s)) and the total number of possible codes are determined, one or more regions along the code sequence can then be identified (block 220), where a region spans some subset of codes along the total code sequence. In one embodiment, the size of each region is equal to the size of the big forward window. For example, at least one rolling code receiver can be divided into four equal regions of 16384 codes per region to total 65,536 codes. In another embodiment, the size of each region is a function of the size of the big forward window and a predetermined number. According to yet another embodiment, the size of each region is a function of the size of the big window and the small window. In yet another embodiment, the maximum region size is the size of the big window plus the size of the small window. The process of dividing the code sequence into regions will be described in more detail below with reference to FIG. 5.

At block 225, one or more codes are captured in each region. In the case of a rolling code system having both small and big forward windows, a pair of codes is captured for each region where each pair is within the code pair spread. In one embodiment, the code pair spread is equal to the size of the small forward window (e.g., 15). However, the code pair spread may be equal to any value, smaller or larger than the small forward window. In one embodiment, a code pair is identified in each region such that the first code of a code pair in a subsequent region is within the big forward window of the second code in a code pair in the immediately previous region, and so on. As will be discussed in more detail below, this overlapping may be done to minimize the number of times the transmitter needs to be activated until it provides an acceptable code to a rolling code receiver. The identified code pairs may be captured by cycling the rolling code transmitter through the code pattern sequence and capturing the identified code pairs. At that point the code pairs form a set of codes in a code table (e.g., code table 164) that may be loaded into NV memory 160 of transmitter 100.

If, on the other hand, it is determined, at block 205, that the rolling code receiver does not follow the forward window model, the process 200 continues to decision block 230. At block 230, a determination is made as to whether the receiver follows a forward/backward window mode. If so, process 200 moves to block 235 where the size of the forward window is determined. As with block 210 above, this may be done by sequentially capturing codes transmitted from a rolling code transmitter to a corresponding rolling code receiver and observing the receiver's response.

The size of the forward window can also be estimated. Each estimation can then be tested using a trial-and-error process until the size of the forward window is known to be no more than X. By way of a non-limiting example, each $500^{th}$ code in a code sequence of 10,000 may be captured from a rolling code transmitter (of a manufacturer) and stored. Assuming that the current code for the corresponding receiver is 1, the captured $500^{th}$ code can then be transmitted to the corresponding rolling code receiver. If the receiver accepts the code and actuates a device, the forward window must be larger than 500. Moreover, since the $500^{th}$ code was accepted, it becomes the current code for the receiver and the receiver will now expect code 501. However, rather than transmitting the $501^{st}$ code as expected, the $1500^{th}$ code may be transmitted. If the receiver again accepts it by actuating the device, then it is known that the forward window is at least 1000 codes wide. This process continues until, each time increasing the spread between the current code and the transmitted code, until the receiver no longer accepts the transmitted code. At that point it is known that the code provided is within 500 codes of the actual size of the forward window. It should be appreciated, however, that any other increment of codes may be used and tested according to this trial-and-error process. It should further be appreciated that rather than sequencing through only 10,000 codes, it may be necessary to sequence through a larger number of codes, such as when the size of the forward window exceeds 10,000. In addition, rather than capturing each $500^{th}$ code, in another embodiment, the process can be streamlined by only capturing the $500^{th}$ code, $1500^{th}$ code, $3000^{th}$ code, etc., where the spread between the captured code is increased by 500 or some other amount.

Once the size of the forward window is determined, the process 200 continues to block 240 to determine the size of the backward window. As mentioned above, the backward window contains a specific number of codes preceding the current code. In this embodiment, the forward/backward type rolling code receiver will not accept any code contained in the backward window. As with the forward window, the size of the backward window can be determined by capturing a series of sequential codes transmitted from a rolling code transmitter to a corresponding rolling code receiver and observing the receiver's response through a trial-and-error process. For example, in one rolling code system following a forward/backward window model, the rolling code receiver will accept any two sequential codes which do not fall within the backward window.

Once the forward and backward window sizes have been determined at blocks 235 and 240, respectively, the appropriate fixed activation codes may be captured and stored in a code table of a transmitter. For example, in one rolling code system, the minimum number of fixed codes needed to operate the rolling code receiver is three. The first two codes can be any two sequential codes along the sequence of possible codes. The third code should be at least the size of the backward window from the second of the sequential codes.

For example, suppose the size of the forward window is 5000 and the size of the backward window is 300. Suppose also that the two sequential codes chosen are codes 1 and 2, although any other two codes could have been chosen. In this case, the third code should be at least code 303 to avoid the backward window. For sake of illustration, the third code is selected to be code 500. Thus, the transmitter will operate the rolling code receiver by sending only fixed codes 1, 2 and 500 in sequence when activated. When the Chamberlain® system is first activated the receiver will expect code 1 and the transmitter will transmit code 1. The next time, the receiver will expect code 2 and the transmitter will transmit code 2. Thereafter the receiver will expect code 3, but the transmitter will send code 500. Since this is within the forward window, the receiver will accept the code and actuate the device. At this point the receiver will next expect 501, but the transmitter will send fixed code 1. While the receiver will not accept the last 300 codes due to its backward window, code 1 is not considered to be in the backward window (i.e., it is more than 300 codes prior to current code 500 along the code pattern sequence). Moreover, since code 1 is not within the forward window (i.e., within the next 5000 codes), it must be followed by a second sequential code, or in this case fixed code 2. Thus, by sending code 2 along with or after code 1, the fixed code transmitter will activate the receiver. It should be appreciated that codes 1 and 2 may be sent simultaneously, separated by a discrete time period (e.g., signal lag), or sent individually as the transmitter is activated (e.g., code 1 is sent when user activates the transmitter, then code 2 is sent when the user again activates the transmitter).

In one embodiment, these three fixed codes are captured and stored in the Chamberlain® code table 162 in NV memory 160 of fixed code transmitter 100. Thereafter, the transmitter 100 may be activated, using input(s) 140, to control a Chamberlain® rolling code receiver having a total of 2^32 possible code combinations with only three fixed codes.

Referring back to decision block 230, if a determination is made that the receiver does not follow a forward/backward window model, then the process moves to block 250 to determine the size and orientation e.g., forward and/or backward, etc.) of any code window(s) recognized by the rolling code receiver. Again, this may be accomplished through a trial-and-error process whereby codes transmitted from a rolling code transmitter to a corresponding rolling code receiver are captured while monitoring the receiver's response. In general, forward windows may be detected as described above with reference to blocks 210 and 235, and backward windows may be detected as also described above with reference to block 240.

Once the nature of the code window(s) is determined, the minimum number of fixed codes needed to operate the rolling code receiver is then determined at block 255. In one embodiment, the minimum number of fixed codes is a function of the number of all possible codes along the rolling code sequence. In another embodiment, the number of fixed codes is a function of the size, number and orientation of any code windows recognized by the rolling code receiver. Thereafter, at block 260, the fixed codes are captured and stored in NV memory 160. It is to be appreciated that although blocks 205, 210, 230, 235, 240, and 250 are shown as separate blocks, one or more of such blocks may be combined.

Figure 3:
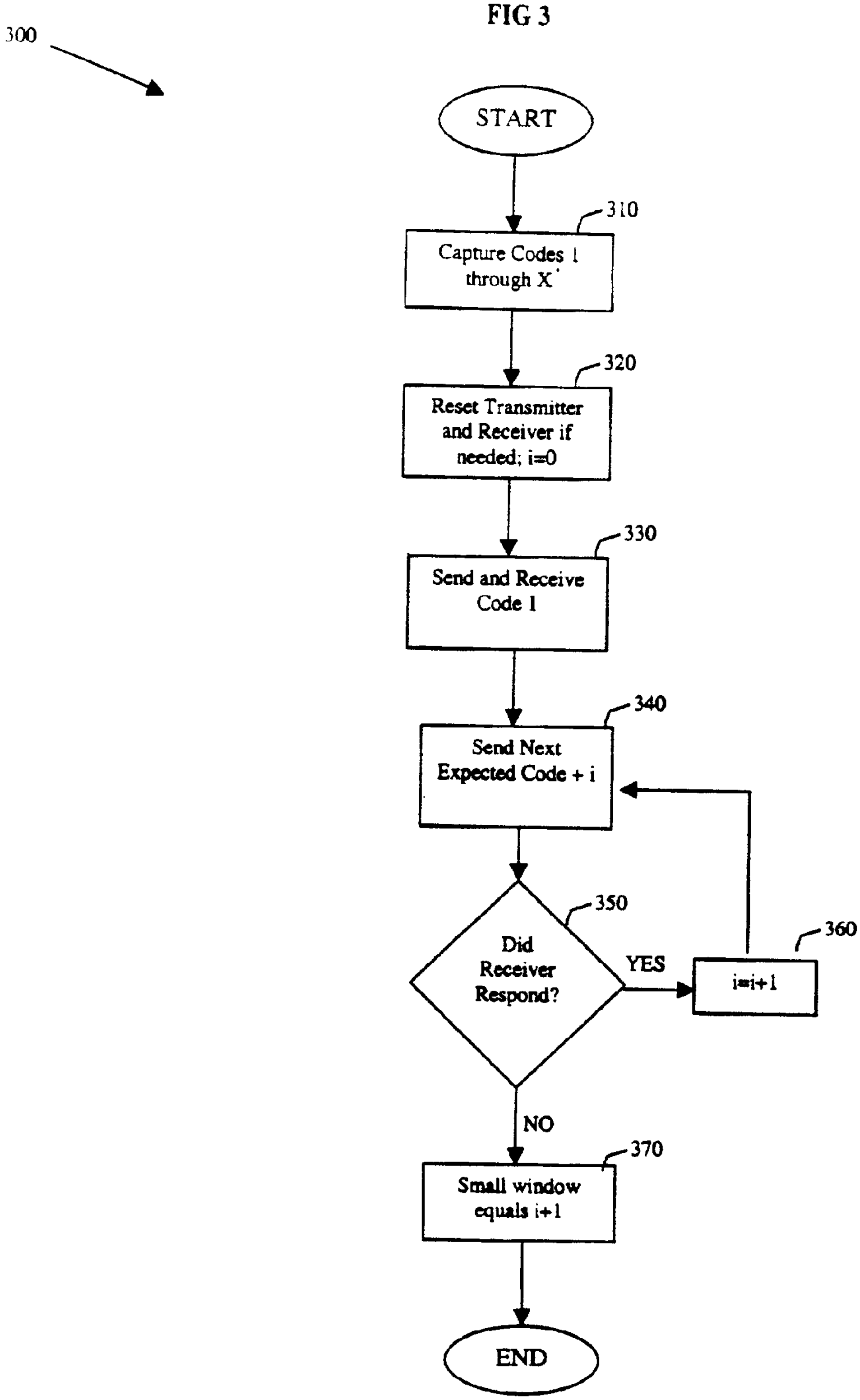
FIG. 3 is a block diagram of one embodiment of a process for determining the small forward window size of at least one type of rolling code receiver.

FIG. 3 is a flow diagram of a process 300 for determining the small forward window of at least one type of rolling code receiver, according to one embodiment. This process begins at block 310 where codes 1 through X of the rolling code transmitter are captured by sequentially actuating the transmitter and capturing the corresponding code. The value of X can range between 2 and the total number of possible code combinations. However, since most small forward windows will tend to be of a relatively small size, it may be desirable to capture only a few codes at first. At block 320, the rolling code transmitter/receiver system may optionally be synchronized, if needed. This may be done by, for example, resetting the system. Also at block 320, a variable i is set to zero. If reset, the first time the transmitter is actuated it will transmit code 1, which is the same code the receiver is expecting. At block 330, the rolling code transmitter transmits code 1, which is received and accepted by the rolling code receiver. At block 340, the transmitter transmits the next expected code plus the current value of i (initially zero). Thus, the transmitter transmits code 2, which is the same code the receiver is expecting. At block 350, a determination is made as to whether the receiver accepted the transmitted code (e.g., code 2). If so, the process continues to block 360 where i is incremented by one. Now i is equal to 1. Returning to block 340, the transmitter transmits code 4, which is the code corresponding to the next expected value (i.e., 3) plus the value of i (i.e., 1). Again, at block 350 a determination is made as to whether the receiver accepted code 4 even though the receiver was expecting code 3. If so, the small window is at least 2 codes wide. The process continues to block 360 where the value of i is again incremented to a value of 2. Block 340, 350, and 360 are sequentially executed until the receiver fails to accept the transmitted code (at block 350). In such case, the process moves to block 370 where the value of the small window is determined, which is equal to the current value of i+1. It should be appreciated that other processes for determining the value of the small window may be used. Moreover, rather than starting the process 300 at code 1, the process could have been started at any other code number within the possible code sequence.

Figure 4:
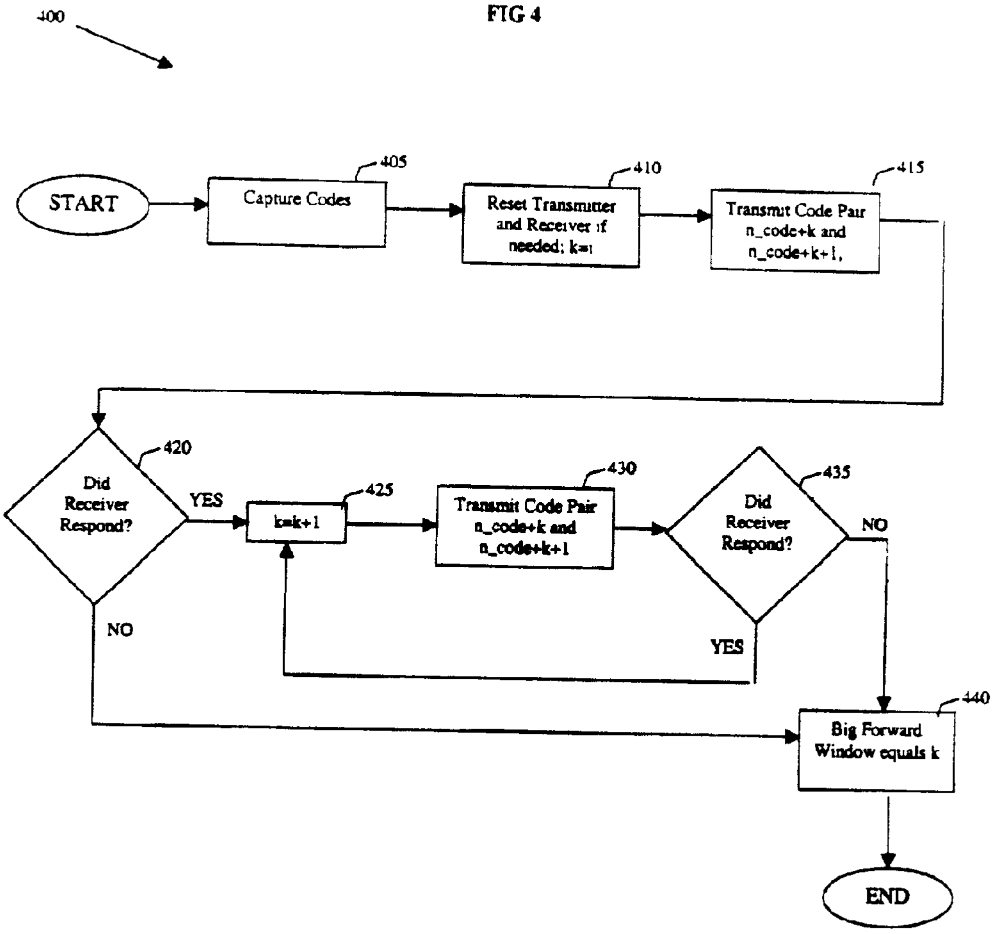
FIG. 4 is a block diagram of one embodiment of a process for determining the big forward window size of at least one type of rolling code receiver.

FIG. 4 illustrates a flow diagram of a process 400 for determining a big forward window of at least one type of rolling code receiver, according to one embodiment. Referring to FIG. 4, at block 405, a plurality of specific codes from the transmitter are captured. In one embodiment, these codes represent codes 1 through 16,384, although another amount may also be captured depending on the estimated size of the big window.

At block 410, both the transmitter and receiver may be synchronized, if necessary, which may be done by resetting both the transmitter/receiver pair. The next code the receiver expects in the sequence of codes will be referred to as the "n_code". When the system is reset, n_code is equal to 1. Also, at block 410, a variable k is set to i, where i is the size of the small window determined by process 300 (FIG. 3). At block 415, a pair of codes (n_code+k and n_code+k+1) is transmitted to the rolling code receiver. For example, assuming the value of the small window (i) is 15, the transmitter transmits codes 16 and 17, while the receiver expects code 1. If, at decision block 420, the receiver does not respond, the small window is the same size as the big window and process 400 continues to block 440. If, on the other hand, the receiver responds to codes 16 and 17, the process 400 continues to block 425 where k is incremented by 1. The next expected code by the receiver is 18, which is the new value of n_code. At block 430, the transmitter transmits a pair of codes (n_code+k and n_code+k+1), which are codes 34 (18+16) and 35 (18+17), to the receiver. If, at block 435, it is determined that this code pair is accepted by the receiver, then the big window is at least 16 codes wide. Blocks 425, 430, and 435 are sequentially executed until the receiver fails to respond to the code pair (at decision block 435). At that point, the value of k will equal the size of the big window. In one rolling code receiver, the value of the big window is 16,384 codes wide.

It should be appreciated that the codes pair may be sent simultaneously, separated by a discrete time period (e.g., signal lag), or sent individually as the transmitter is activated by a user (e.g., first code in code pair may be sent when the user activates the transmitter, then second code is sent when the user again activates the transmitter).

Figure 5:
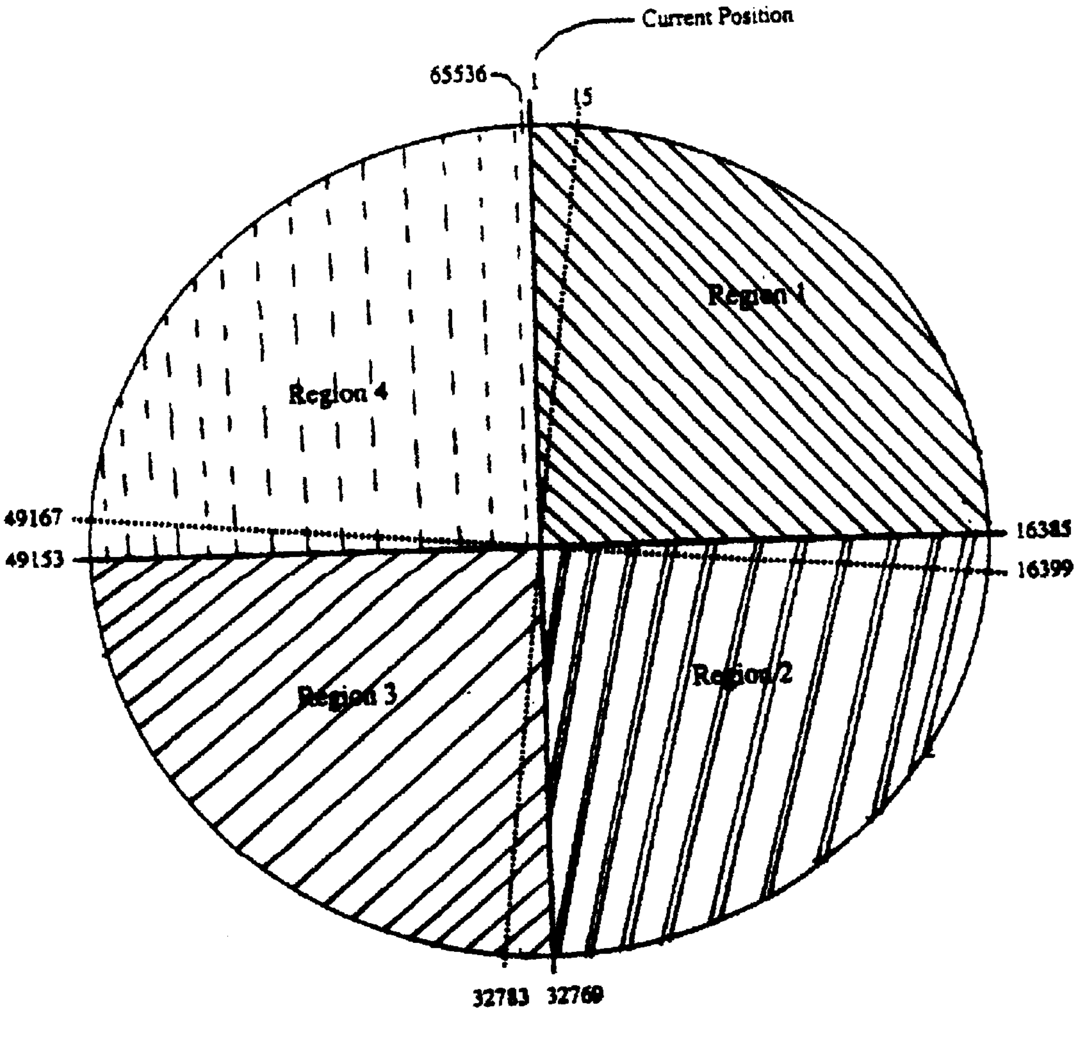
FIG. 5 is a pie diagram showing the layout of the code combinations for a rolling code receiver, according to one embodiment.

Referring now to FIG. 5, a pie diagram containing one embodiment of a layout of possible receiver activation codes is depicted. This embodiment follows at least one forward window model rolling code system and is provided for illustration purposes. In this rolling code system, there are 65,536 possible rolling code combinations. That is, this rolling code transmitter-receiver pair each contain a code generator which uses a secret algorithm to produces a sequence of 65,536 possible code patterns. As discussed above, when such a receiver is first activated, it will expect to receive code pattern 1. Similarly, the associated transmitter will send code pattern 1 the first time it is used since both the receiver and transmitter are functioning with the same type code generator.

In the embodiment of FIG. 5, code pattern 1 is shown as being the current position of the receiver. This exemplary embodiment assumes there are 65,536 possible code combinations, a small forward window that is 15 codes wide, a big forward window that is 16384 codes wide, and that the code pair spread is equal to the small forward window. Since the current code position of the receiver is 1, the receiver will accept any single code between 1 and 15 (small window size of 15). In addition, it will accept any code pair between 16 and 16384 (big window size of 16,384), so long as the codes in the code pair satisfy the code pair spread. If, on the other hand, a code pair outside of the big window is transmitted by the transmitter, the rolling code receiver will simply ignore the code pair. Similarly, a code pair transmitted within the big forward window but more than 14 codes apart will also be ignored by the receiver.

In order to determine the minimum number of fixed code pairs which can be used to operate this receiver, the field of all possible code combinations (i.e., 65,536) is divided into four regions as shown in FIG. 5. By doing this, it can be seen that code pairs may be select from between the solid region lines and the dotted region lines to minimize the number of code pairs. In other words, in this embodiment, a minimum of four fixed code pairs can be selected to operate the rolling code receiver, so long as the first code in the first code pair is selected from codes 1 to 15, the first code in the second code pair is selected from codes 16385 to 16399, the first code in the third code pair is selected from codes 32769 to 32783, and the first code in the fourth code pair is selected from codes 49,153 to 49167. In one embodiment, the following code pairs are transmitted for each press sequence:

| Press Sequence | First Code | Second Code |
|---|---|---|
| 1 | 1 | 3 |
| 2 | 16385 | 16387 |
| 3 | 32769 | 32771 |
| 4 | 49153 | 49155 |

The above values may be stored in code table 164 in NV memory 160 (FIG. 1). When transmitter 100 is first activated, it will send the first code pair 1 and 3 using RF transmission circuit 170. The second time transmitter 100 is activated it will send the next code pair 16385 and 16387. Since code 16385 is within the big forward window of the last transmitted code (e.g., code 3 in the first code pair), this code pair will be accepted by the receiver and the receiver will actuate the device. The next time the transmitter is activated it will send the next code pair (32769 and 32771). Again, since the first code 32769 is within the big forward window of the previous code (code 16387 in the second code pair), this code pair will be accepted by the receiver. In this manner, the transmitter 100, using four code pairs, can be used to operate the rolling code receiver.

Suppose now that the fixed code transmitter 100 and the rolling code receiver are not synchronized and that the receiver expects a random code number such as code 32,044, while the fixed code transmitter 100 is set to send the first code pair (e.g., 1 and 3). In this case, the transmitter would send codes 1 and 3, which would be ignored by the receiver. A user would then activate the transmitter 100 again causing the transmitter to transmit the second code pair (codes 16385 and 16387). However, since the second code pair is not within the big forward window of the expected code, this transmission will be ignored. A user would then activate the transmitter to transmit the third code pair (e.g., 32769 and 32771), which is within the big forward window for code 32,044. In this case the receiver would accept the code pair and be activated. Moreover, the transmitter and receiver are now synchronized in that the next code the receiver will expect is 32772, while the next code pair which will be transmitted by the transmitter is 49153 and 49155. Since code 49153 is within the big forward window (within 16383) of the next expected code 32772, the code pair will be accepted by the receiver. Thereafter, the receiver's next expected code will jump to 49156, since the last code it accepted was code 49155. Now that the transmitter has come full circle, it will transmit codes 1 and 3 again. As with the last transmission, code 1 falls within the big forward window of the code the receiver is expecting (i.e., 49156), meaning that the receiver will accept the code pair containing codes 1 and 3.

Figure 6:
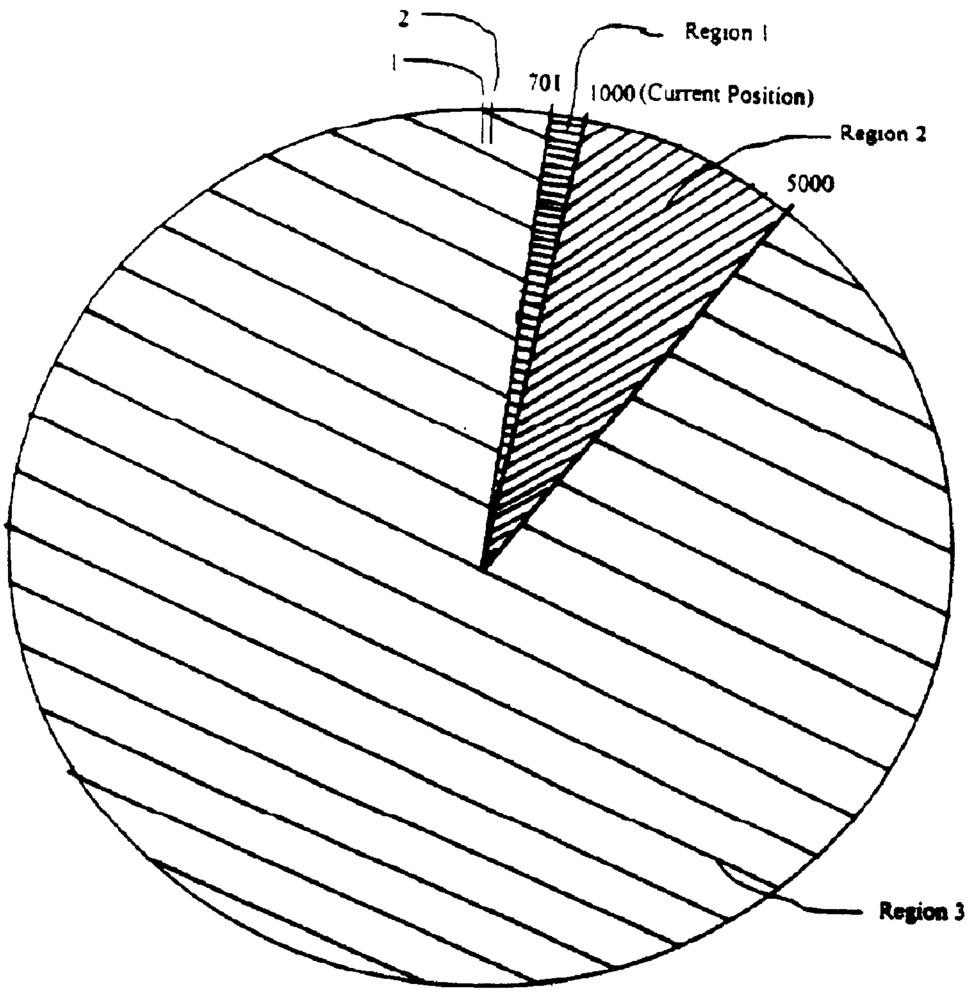
FIG. 6 is a pie diagram showing the code combinations for a rolling code receiver, according to another embodiment.

Referring now to FIG. 6, a pie diagram containing another embodiment of a layout of possible receiver activation codes is depicted. This embodiment follows at least one type of a forward/backward window model rolling code system, and is provided for illustration purposes. This particular rolling code system has 2^32 (or 4,294,967,296) possible rolling code combinations.

In the embodiment of FIG. 6, it is assumed that the current position of the receiver is 1000. Moreover, this receiver has a backward window which is 300 codes wide (Region 1), and a forward window which is 4000 codes wide (Region 2). This receiver will accept any code in Region 2, no code in Region 1, and any two consecutive codes in Region 3. That being the case, a minimum of three codes may be used to fully operate the receiver. In one embodiment, these codes are 1, 2 and 1000. As explained in more detail below, these three codes can be used by the fixed code transmitter 100 to operate the rolling code receiver. It should be appreciated that other code combinations may be used to operate the receiver.

As seen from the embodiment of FIG. 6, the current receiver position is 1000. However, instead of transmitting code 1001, as expected by the receiver, the transmitter will transmit codes 1 and 2. Since these are sequential codes in Region 3, the receiver will actuate the attached device. The receiver now expects code 3. However, instead of transmitting code 3, the transmitter will transmit code 1000. Since this would be in the forward window of the expected code 3 (forward window is 4000 codes wide), it will be accepted by the receiver. By cycling through these three fixed codes, the fixed code transmitter 100 can be used to operate this rolling code receiver. It should be appreciated that many other fixed code combination could also be used to fully operate the receiver.

Figure 7:
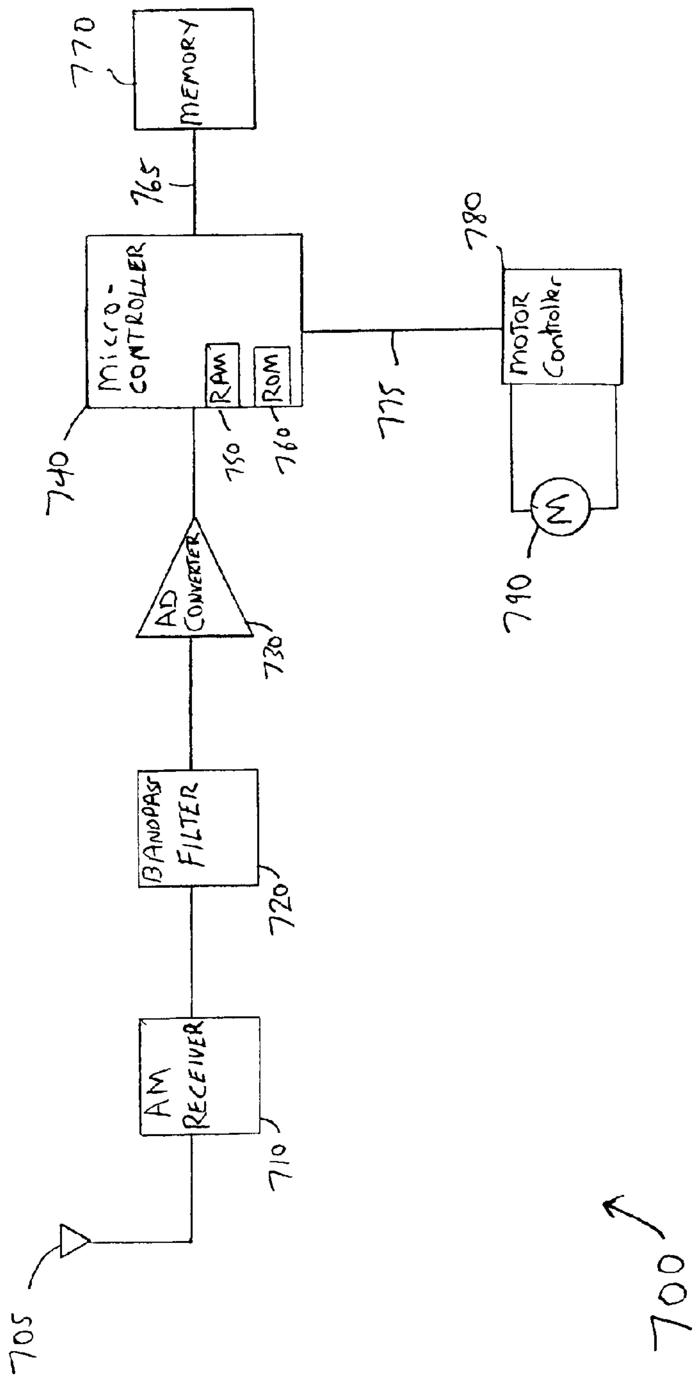
FIG. 7 depicts a typical rolling code receiver usable to implement one or more aspects of the invention.

A typical rolling code receiver usable to implement one or more aspects of the invention is depicted in FIG. 7. Rolling code receiver 700 includes an antenna 705 coupled to an amplitude modulated (AM) receiver 710. The AM receiver 710 provides a demodulated output via a bandpass filter 720 to an analog-to-digital converter 730 which provides input to a microcontroller 740. The microcontroller 740 is depicted as having a read-only memory (ROM) 750 and a random-access memory (RAM) 760. The microcontroller 740 is also coupled to a memory 770 via a memory bus 765, which is typically a non-volatile memory. The microcontroller 740 has an output line 775 coupled to a motor controller 780 which may include any number of relays or other configurations to provide electrical outputs to motor 790. This electric motor 790 may be a garage door opener, or any other motor used to actuate a barrier.

While the preceding description has been directed to particular embodiments, it is understood that those skilled in the art may conceive modifications and/or variations to the specific embodiments and described herein. Any such modifications or variations which fall within the purview of this description are intended to be included therein as well. It is understood that the description herein is intended to be illustrative only and is not intended to limit the scope of the invention. Rather the scope of the invention described herein is limited only by the claims appended hereto.

What is claimed is:

1. A transmitter-receiver system comprising:

a rolling code receiver that generates a sequence of unique codes based on a rolling code algorithm; and a fixed code transmitter including a memory that contains a set of fixed codes, said fixed code transmitter operable to transmit one or more codes of the set of fixed codes to operate the rolling code receiver, wherein the set of fixed codes has fewer codes than a total number of unique codes that is generated by the rolling code receiver.

2. The system of claim 1, wherein the memory of the fixed code transmitter contains a second set of fixed codes, said fixed code transmitter to transmit one or more codes of the second set of fixed codes to operate a second rolling code receiver.

3. The system of claim 1, wherein the rolling code receiver, upon reception of a received code, to generate a current code and to actuate a device if the received code is within a code window between the current code and the current code plus a predetermined number of codes.

4. The system of claim 1, wherein said rolling code receiver includes a code window, and said fixed code transmitter, upon activation, to transmit first and second codes to said rolling code receiver, said first code being within a predetermined number of codes of said second code along a code sequence, said rolling code receiver to be activated in response to receiving the first and second codes.

5. A fixed code transmitter comprising:

a signal transmission circuit;

a memory that includes a set of fixed codes for operating a rolling code receiver;

a processor coupled to the signal transmission circuit and memory, said processor, in response to actuation of an input, to retrieve one or more codes of the set of fixed codes from the memory and transmit the one or more fixed codes, using the signal transmission circuit, to activate the rolling code receiver, wherein the set of fixed codes has fewer codes than a total number of unique codes that can be generated by the rolling code receiver.

6. The fixed code transmitter of claim 5, wherein said memory further includes a second set of fixed codes for controlling a second rolling code receiver, said processor to (i) detect a selection request corresponding to one of the rolling code receivers, (ii) retrieve one or more codes of one of the first set and second set of fixed codes corresponding to a selected rolling code receiver, and (iii) transmit said retrieved one or more codes to actuate the selected rolling code receiver.

7. The fixed code transmitter of claim 5, wherein said retrieved one or more of fixed codes includes a code pair, having a first code and a second code, said second code to be within a predetermined number of codes from said first code, said processor to transmit the code pair to operate the rolling code receiver.

8. The fixed code transmitter of claim 7, wherein said predetermined number is between 2 and 100.

9. A method of operating a rolling code receiver using a fixed code transmitter comprising:

capturing a plurality of codes from a rolling code transmitter corresponding to the rolling code receiver;

identifying a set of fixed codes that will operate the rolling code receiver;

storing said set of fixed codes in a memory of said fixed code transmitter; and activating said rolling code receiver by transmitting, from said fixed code transmitter, one or more codes of said set of fixed codes, wherein said set of fixed codes has fewer codes than a total number of unique codes that is generated by the rolling code receiver.

10. The method of claim 9 further comprising:

capturing a second plurality of codes from an additional rolling code transmitter corresponding to an additional rolling code receiver;

identifying an additional set of fixed codes that will operate the additional rolling code receiver;

storing said additional set of fixed codes in the memory of said fixed code transmitter;

accessing one or more of said additional set of fixed codes based on a user selection; and transmitting, from said fixed code transmitter, one or more codes from said additional set of fixed codes to activate the additional rolling code receiver.

11. The method of claim 9, wherein said activating said rolling code receiver comprises, activating said rolling code receiver by transmitting, from the fixed code transmitter, a code pair of said set of fixed codes comprised of a first code and a second code, said second code to be within a predetermined number of codes from said first code along a code sequence.

12. A method of operating a rolling code receiver with a fixed code transmitter comprising:

transmitting, from the fixed code transmitter, one or more codes from a set of fixed codes; and operating the rolling code receiver using the one or more codes, wherein the set of fixed codes has fewer codes than a total number of codes that can be generated by the rolling code receiver.

13. The method of claim 12, wherein said set of fixed codes is a subset of a rolling code sequence of the rolling code receiver.

14. The method of claim 12, wherein prior to said transmitting, said method comprises:

capturing a plurality of codes from a rolling code transmitter corresponding to the rolling code receiver;

identifying the set of fixed codes that is capable of operating said rolling code receiver;

storing said set of fixed codes in a memory of said fixed code transmitter; and accessing one or more of said set of fixed codes for transmission based on a user selection.

15. A transmitter-receiver system comprising:

a rolling code receiver coupled to a device, said rolling code receiver to generate a sequence of unique codes based on a rolling code algorithm, said rolling code receiver to actuate the device if a received code is equal to a current generated code in the sequence of unique codes; and a transmitter including a memory that contains a set of codes, said transmitter, upon each actuation, to transmit one or more of the set of codes to operate the rolling code receiver to actuate the device, said set of codes having fewer codes than a total number of codes in the sequence of unique codes.

16. The system of claim 15 wherein said rolling code receiver to actuate the device if the received code is equal to a code within a code window defined by the current generated code and the current generated code plus a predetermined number.

17. A transmitter for operating a rolling code receiver, comprising:

a fixed code transmitter including a memory that contains a set of fixed codes, said fixed code transmitter to transmit one or more codes of the set of fixed codes to operate the rolling code receiver, wherein the set of fixed codes has fewer codes than a total number of unique codes that is generated by the rolling code receiver.

* * * * *